United States Patent
Tohyama

(10) Patent No.: US 7,502,129 B2
(45) Date of Patent: Mar. 10, 2009

(54) IMAGE TRANSMISSION APPARATUS AND CONTROL METHOD

(75) Inventor: Daisetsu Tohyama, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1059 days.

(21) Appl. No.: 10/807,346

(22) Filed: Mar. 24, 2004

(65) Prior Publication Data

US 2005/0030579 A1  Feb. 10, 2005

(30) Foreign Application Priority Data

Aug. 6, 2003  (JP)  ............................. 2003-288049

(51) Int. Cl.
    *G06F 15/00*  (2006.01)
(52) U.S. Cl. .................. 358/1.13; 358/1.15; 358/1.6; 358/1.9; 358/518; 358/448; 709/218; 709/232
(58) Field of Classification Search ............... 358/1.15, 358/1.6, 1.9, 1.13, 518, 530, 435, 448; 709/218, 709/232

See application file for complete search history.

(56) References Cited

U.S. PATENT DOCUMENTS

| | | | |
|---|---|---|---|
| 5,715,070 A | | 2/1998 | Tone et al. |
| 6,151,464 A | * | 11/2000 | Nakamura et al. ............ 399/79 |
| 6,456,402 B1 | * | 9/2002 | Motoyama .................. 358/450 |
| 6,801,340 B1 | | 10/2004 | Endo |
| 2004/0190045 A1 | * | 9/2004 | Matsuhara et al. ......... 358/1.15 |

FOREIGN PATENT DOCUMENTS

| JP | 8-248841 | 9/1996 |
|---|---|---|
| JP | 8-274986 | 10/1996 |
| JP | 11-3188 A | 1/1999 |
| JP | 11-134263 | 5/1999 |
| JP | 2001-217980 A | 8/2001 |
| JP | 2002-185693 A | 6/2002 |
| JP | 2002-223337 A | 8/2002 |
| JP | 2002-359739 | 12/2002 |

OTHER PUBLICATIONS

Japanese Office Action, with English-language translation, dated Sep. 27, 2006.
A Notice on Reasons for Rejection issued in a corresponding Japanese patent application, 2005.

* cited by examiner

*Primary Examiner*—Edward L Coles
*Assistant Examiner*—Chan S Park
(74) *Attorney, Agent, or Firm*—Buchanan Ingersoll & Rooney PC

(57) ABSTRACT

An image transmission apparatus capable of carrying out efficient image processing and transmission as a whole even where multiple image transmission requests exist, without increasing the complexity of the apparatus construction. The image transmission apparatus is provided with multiple task processors that are respectively responsible for executing one or more of the image processing operations, a designating unit that designates the image processing operation(s) to be performed, a controller that, where multiple recipients are specified with regard to the image data and different image processing operations are specified for the different recipients, controls each task processor such that the nth operation is executed in common for the recipients for which all operations up to the nth operation are identical, and a transmission unit that transmits to the specified recipients image data that has undergone all of the image processing operations.

19 Claims, 13 Drawing Sheets

| RECIPIENTS | (S1) SLANT CORRECTION | (S2) VERTICAL ORIENTATION CORRECTION | (S3) OVERLAY CORRECTION | (S4) HALFTONE CORRECTION |
|---|---|---|---|---|
| A | ○ | ○ | ○ | ○ |
| B | ○ | ○ | ○ | × |
| C | ○ | ○ | × | ○ |
| D | × | × | × | ○ |

FIG. 4

| REQUESTED JOBS | SLANT CORRECTION | VERTICAL ORIENTATION CORRECTION | OVERLAY CORRECTION | HALFTONE CORRECTION | PAGE NUMBER | RECIPIENTS | ORDER AFTER REARRANGEMENT |
|---|---|---|---|---|---|---|---|
| RJ1 | ○ | ○ | ○ | ◉ | 5P | A | 3 |
| RJ2 | × | × | × | ○ | 10P | C | 1 |
| RJ3 | ○ | ○ | ○ | × | 7P | B | 2 |
| RJ4 | × | × | × | ○ | 10P | C | 1 |
| RJ5 | ○ | ○ | × | ○ | 1P | B | 2 |

Fig. 9

IMAGE TRANSMISSION APPARATUS AND CONTROL METHOD

This application is based on Japanese Patent Application No. 2003-288049 filed in Japan in Aug. 6, 2003, the entire content of which is hereby incorporated by reference.

BACKGROUND OF THE INVENTION

1. Field of the Invention

The present invention relates to an image transmission apparatus that transmits to a prescribed recipient an image after subjecting such image to image processing, as well as to an associated control method.

2. Description of the Related Art

In the conventional art, an apparatus has been proposed that transmits to a prescribed recipient an image that has been input via a scanner or the like and then subjected to image processing. For example, according to the apparatus marketed as 'Ridoc Document Router Version 2' (Ricoh Corporation, search performed on Jul. 9, 2003, http://www.ricoh.co.jp/ridoc_ds/rds/rdr/router_v2.pdf), an input image is sent to a prescribed recipient after it is converted into data in the TIFF, PDF or other format.

In this type of apparatus, when there is a large number of transmission requests, image processing becomes backed up, potentially causing delays in image transmission. Accordingly, the methods described in the various documents below have been proposed.

According to the invention described in Japanese Laid-Open Patent Application No. 2002-223337, priority rankings are assigned to jobs in the order of 'scan and distribution request', 'selected document distribution request', and 'document selection request'. Where there are multiple jobs, the jobs are scheduled for execution according to their respective priority rankings.

According to the invention described in Japanese Laid-Open Patent Application No. 2001-217980, a job template in which information such as original document scan parameters, the location in which the original document is registered, the need for correction and the like are set in advance is registered on a scan server. The original document is scanned using the job template and the original document data is registered on the scan server. The user refers to the original document registered on the scan server via a Web server.

According to the invention described in Japanese Laid-Open Patent Application No. 2002-185693, where there are multiple documents awaiting processing, transmission processing is carried out for each document based on a preset priority system.

According to the invention described in Japanese Laid-Open Patent Application No. H 11-3188, the apparatus includes multiple receiving buffers and processing buffers, rastering is carried out for multiple jobs in parallel, and jobs having a shorter processing time are output first.

In addition, 'Minolta PageScope Cabinet' (Minolta Co., Ltd., search performed on Jul. 9, 2003, http://www.pagescope.minolta.com/ja/products/products/psc/index.html) also describes a technology similar to that described herein.

However, the invention described in Japanese Laid-Open Patent Application No. 2002-223337 simply places priority on users who are standing in front of the machine, and is not particularly efficient in performing image processing and transmission in general.

In Japanese Laid-Open Patent Application No. 2001-217980, there is no description of a processing method to be employed where multiple jobs exist at the same time. Therefore, in this situation, as in the conventional art, image processing can easily become backed up, causing delays in transmission.

The invention described in Japanese Laid-Open Patent Application No. 2002-185693 merely executes transmission processing based on a preset priority ranking, and does not improve overall processing efficiency.

The invention described in Japanese Laid-Open Patent Application No. H11-3188 requires multiple processing modules, making the apparatus construction more complex and costly.

As described above, where there are multiple requests for image transmission, the conventional art does not enable image processing and transmission to be carried out efficiently overall.

OBJECT AND SUMMARY

An object of the present invention is provide an improved image transmission apparatus and control method that eliminate the problem described above.

Another object of the present invention is to provide an image transmission apparatus and control method that can carry out more efficient image processing and transmission as a whole than the conventional art even where multiple image transmission requests exist, without increasing the complexity of the apparatus construction.

The above objects are achieved by providing an image transmission apparatus that sends to specified recipients image data awaiting transmission after subjecting such data to image processing consisting of one or more operations, such apparatus including:

multiple task processors that are respectively responsible for executing one or more of the image processing operations described above;

a designating unit that designates the image processing operation(s) to be performed;

a controller that, where multiple recipients are specified with regard to the image data and different image processing operations are specified for the different recipients, controls each task processor such that the nth operation is executed in common for the recipients for which all operations up to the nth operation are identical; and a transmission unit that transmits to the specified recipients image data that has undergone all of the above image processing operations.

The above objects are also achieved by providing an image transmission apparatus that sends to specified recipients image data awaiting transmission after subjecting such data to image processing consisting of one or more operations, such apparatus including:

an image data storage unit that stores the image data for which transmission has been requested;

multiple task processors that are respectively responsible for executing one or more of the image processing operations described above;

a designating unit that designates the image processing operation(s) to be performed to the image data stored in the image data storage unit;

a controller that, where some of the image processing operations designated for each of the multiple units of image data stored in the image data storage unit are identical, controls each task processor such that the subsequent operations for each unit of image data are performed after such data has undergone the shared operations; and a transmission unit that transmits to the specified recipients the image data that has undergone all of the above image processing operations.

The above objects are also achieved by providing an image transmission apparatus that sends to specified recipients image data awaiting transmission after subjecting such data to image processing, such apparatus including:

an image data storage unit that stores the image data for which transmission has been requested;

an image processor that executes the above image processing;

a designating unit that designates the contents of the image processing to be executed for the image data stored in the image data storage unit;

a processing burden estimation unit that, where multiple units of image data are stored in the image data storage unit, divides the image data stored in the image data storage unit into groups by recipient and estimates for each group the processing burden of executing the above image processing of the grouped image data;

a controller that controls the image processor such that the image data undergoes the specified image processing in order from the group having the smallest estimated processing burden as estimated by the processing burden estimation unit to the group having the largest estimated processing burden; and a transmission unit that transmits to the specified recipients the image data that has undergone all of the above image processing operations.

In the above image transmission apparatus, it is acceptable if the image processor is composed of multiple task processors that are respectively responsible for executing the above one or more image processing operations, the designating unit designates the contents of the above image processing by combining one or more operations, and the processing burden estimation unit estimates the processing burden of executing the image processing based on the operations that describe the contents of the image processing.

The above objects are also achieved by providing a control method for an image transmission apparatus that transmits to specified recipients image data that has been subjected to image processing, wherein multiple task processors are respectively responsible for executing one or more of the above image processing operations, and such method is composed of the steps of:

designating the image processing operation to be performed to the image data awaiting transmission;

where multiple recipients are specified for the image data awaiting transmission, and different image processing operations are specified for the different recipients, controlling each task processor such that the nth operation is executed in common for the recipients for which all the operations up to the nth operation are identical; and transmitting to the specified recipients the image data awaiting transmission as to which all of the above image processing operations have been performed.

The above objects are also achieved by providing a control method for an image transmission apparatus that transmits to specified recipients image data that has been subjected to image processing, wherein multiple task processors are respectively responsible for executing one or more of the above image processing operations, and such method is composed of the steps of:

storing the image data awaiting transmission in an image data storage unit;

designating the image processing operation(s) to be performed to the image data awaiting transmission that is stored in the image data storage unit;

where some of the image processing operations designated for each of the multiple units of image data awaiting transmission and stored in the image data storage unit are identical, controlling each task processor such that the subsequent operations for each unit of image data awaiting transmission are performed after such data has undergone the shared operations; and transmitting to the specified recipients the image data awaiting transmission as to which all of the above image processing operations have been performed.

The above objects are also achieved by providing a control method for an image transmission apparatus that transmits to specified recipients image data that has been subjected to image processing, wherein such image processing is executed by an image processor, and such method is composed of the steps of:

storing the image data awaiting transmission in an image data storage unit; designating the contents of the image processing to be performed to the image data awaiting transmission that is stored in the image data storage unit;

where multiple units of image data awaiting transmission are stored in the image data storage unit, dividing the image data awaiting transmission into groups by recipient and estimating for each group the processing burden of executing the above image processing of the all grouped image data awaiting transmission;

controlling the image processor such that the image data awaiting transmission undergoes the specified image processing in order from the group having the smallest estimated processing burden as estimated by the processing burden estimation unit to the group having the largest estimated processing burden; and transmitting to the specified recipients the image data awaiting transmission as to which all of the above image processing operations have been performed.

The above objects are also achieved by providing a computer program that is used on a computer that transmits to specified recipients image data that has been subjected to image processing, wherein multiple task processors are respectively responsible for executing one or more of the above image processing operations, and the program causes the computer to execute the following operations:

designating the image processing operation to be performed to the image data awaiting transmission;

where multiple recipients are specified for the image data awaiting transmission, and different image processing operations are specified for the different recipients, controlling each task processor such that the nth operation is executed in common for the recipients for which all the operations up to the nth operation are identical; and transmitting to the specified recipients the image data awaiting transmission as to which all of the above image processing operations have been performed.

The above objects are also achieved by providing a computer program that is used on a computer that transmits to specified recipients image data that has been subjected to image processing, wherein multiple task processors are respectively responsible for executing one or more of the above image processing operations, and the program causes the computer to execute the following operations:

storing the image data awaiting transmission in an image data storage unit;

designating the image processing operation(s) to be performed to the image data awaiting transmission that is stored in the image data storage unit;

where some of the image processing operations designated for each of the multiple units of image data awaiting transmission and stored in the image data storage unit are identical, controlling each task processor such that the subsequent operations for each unit of image data awaiting transmission are performed after such data has undergone the shared operations; and transmitting to the specified recipients the image data awaiting transmission as to which all of the above image processing operations have been performed.

The above objects are also achieved by providing a computer program that is used on a computer that transmits to specified recipients image data that has been subjected to image processing, wherein such image processing is executed by an image processor, and the program causes the computer to execute the following operations:

storing the image data awaiting transmission in an image data storage unit;

designating the contents of the image processing to be performed to the image data awaiting transmission that is stored in the image data storage unit;

where multiple units of image data awaiting transmission are stored in the image data storage unit, dividing the image data awaiting transmission into groups by recipient and estimating for each group the processing burden of executing the above image processing of the grouped image data awaiting transmission;

controlling the image processor such that the image data awaiting transmission undergoes the specified image processing in order from the group having the smallest estimated processing burden as estimated by the processing burden estimation unit to the group having the largest estimated processing burden; and transmitting to the specified recipients the image data awaiting transmission as to which all of the above image processing operations have been performed.

According to the present invention, image processing and transmission can be conducted more efficiently as a whole than under the conventional art even where multiple requests for image transmission exist.

BRIEF DESCRIPTION OF THE DRAWINGS

These and other objects and features of the present invention will become clear from the following description taken in conjunction with the preferred embodiments thereof with reference to the accompanying drawings, in which:

FIG. 4 shows an example of an image processing designation where one original document image is to be transmitted to multiple recipients;

FIG. 9 shows an example of a designation for image processing and the like where multiple original document images are to be transmitted;

DETAILED DESCRIPTION OF THE PREFERRED EMBODIMENTS

Figure 1:
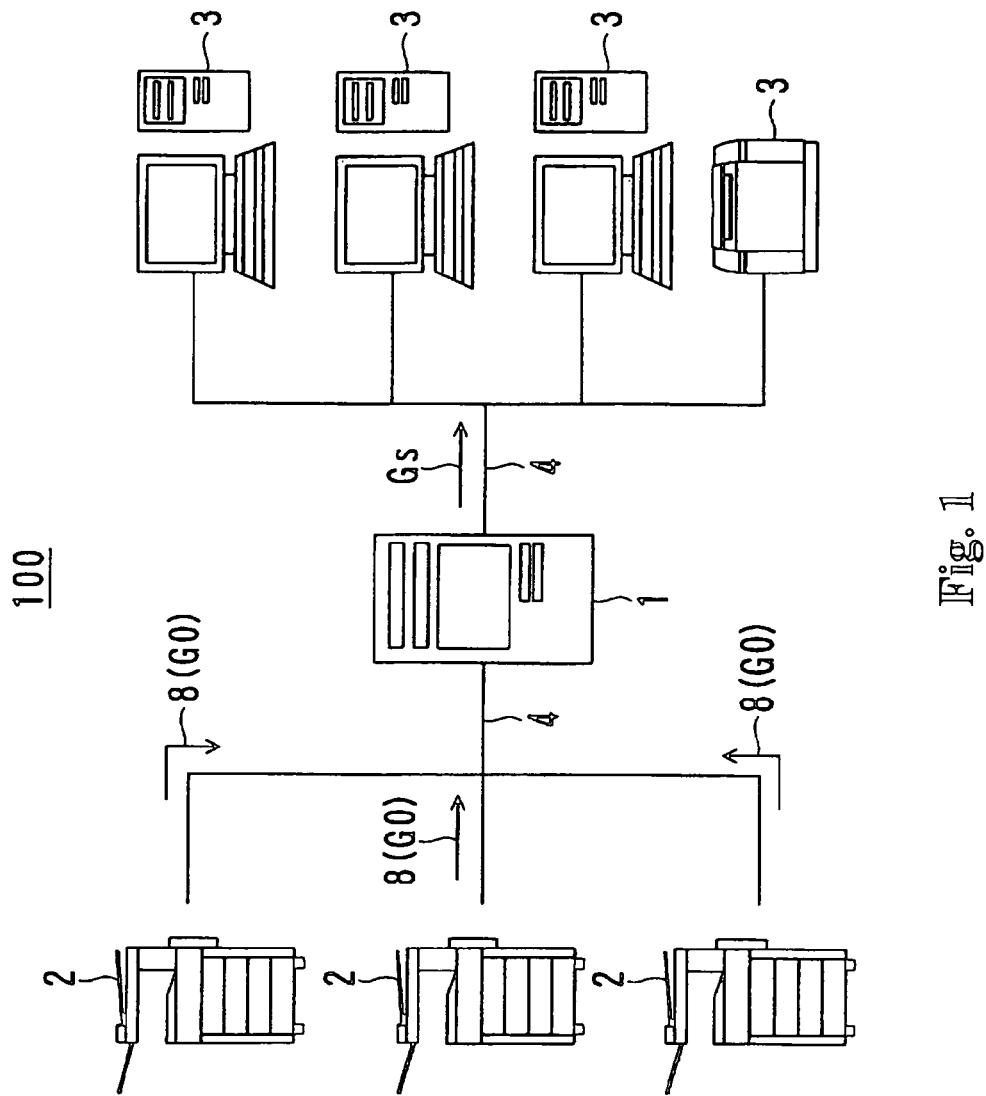
FIG. 1 shows an example of the construction of an image transmission/receipt system that includes an image transmission server pertaining to the present invention.
Figure 2:
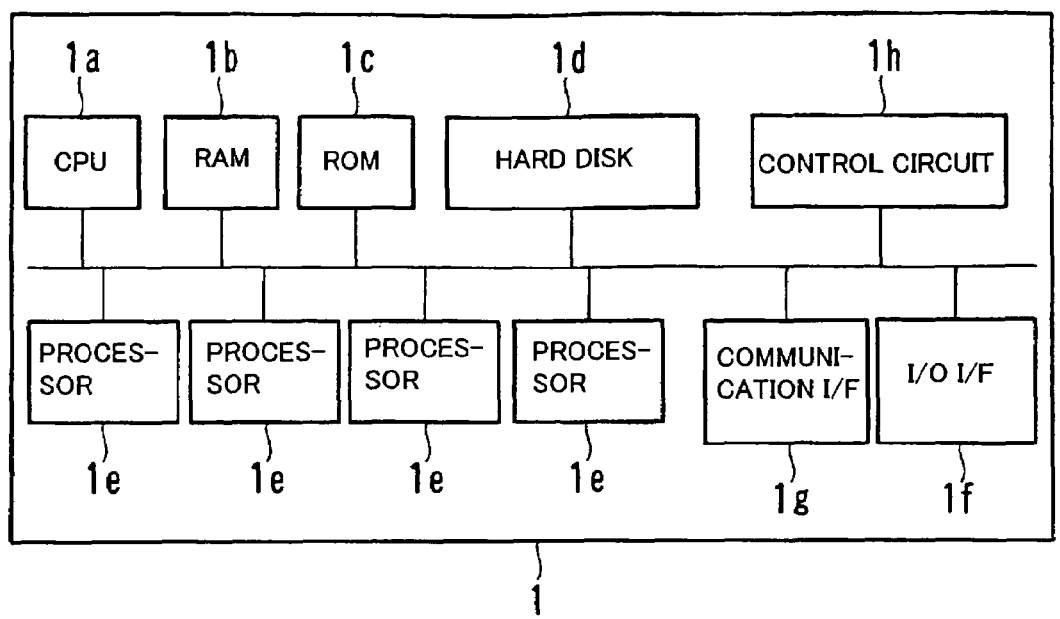
FIG. 2 shows an example of the construction of the hardware for the image transmission server.
Figure 3:
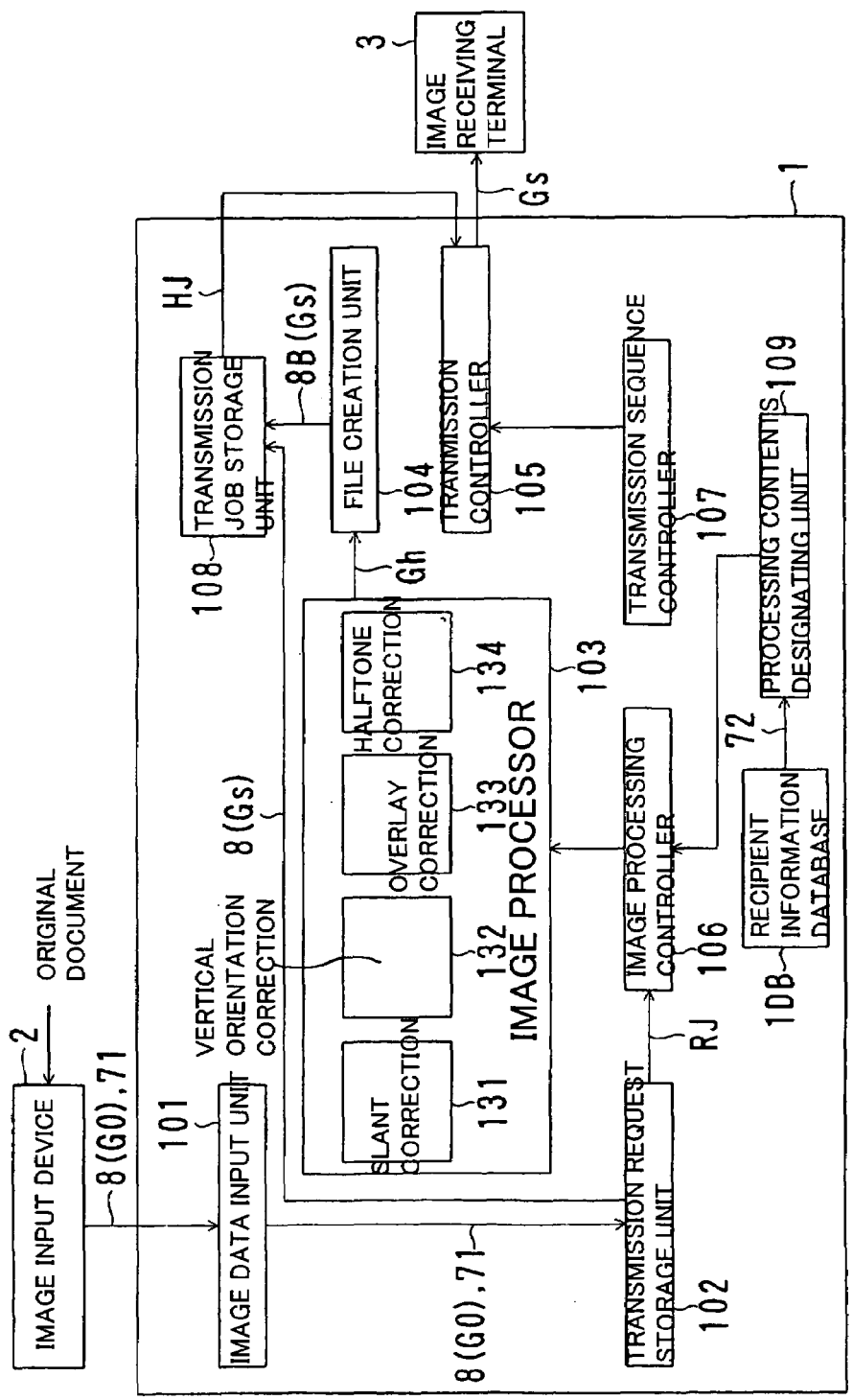
FIG. 3 shows an example of the functional construction of the image transmission server.

FIG. 1 shows an example of the construction of an image transmission/receipt system 100 that includes an image transmission server 1 pertaining to the present invention, FIG. 2 shows an example of the construction of the hardware for the image transmission server 1, and FIG. 3 shows an example of the functional construction of the image transmission server 1.

As shown in FIG. 1, the image transmission/receipt system 100 is composed of the image transmission server 1 pertaining to the present invention, an image input device 2, an image receiving terminal 3 and the like. These devices are mutually interconnected over communication lines 4. These communication lines 4 may consist of the Internet, an Intranet, public telephone circuits or dedicated wiring.

The image input device 2 is a device that reads original document images to be transmitted to the image receiving terminal 3 and generates image data 8. As the image input device 2, a multiple-function apparatus (referred to below as a 'multi-function peripheral' or 'MFP') that combines the functions of a copier, printer, scanner, facsimile machine and document server, for example, is used.

As the image receiving terminal 3, a device that can receive e-mail or image data is used. For example, a personal computer, workstation, MFP, facsimile machine or IPP-compatible printer is used.

The image transmission server 1 is an apparatus that transmits to specified recipients an original document image G0 that was read and input by the image input device 2. For example, the file containing the original document image G0 is attached to an e-mail and sent to the e-mail address of the user of the image receiving terminal 3. Alternatively, the telephone number assigned to the image receiving terminal 3 is dialed and analog or digital data representing the original document image G0 is sent via fax transmission. The file containing the original document image G0 can also be sent to the IP address of the image receiving terminal 3 over IPP (Internet Printing Protocol). The original document image G0 is sent to the image receiving terminal 3 through these transmission operations.

The image transmission server 1 includes a CPU 1a, a storage device such as a RAM 1b or a hard disk 1d, an 10 interface 1f, a communication interface 1g, processors (circuits) 1e that respectively carry out slant correction, vertical orientation correction, overlay correction and halftone correction, a control circuit 1h that controls these various devices and processors, and a ROM 1c in which a control program is stored, as shown in FIG. 2.

Alternatively, rather than using a separate processor 1e for each correction operation, the tasks performed in the various correction operations can be stored in a computer program that is installed on the hard disk 1*d* or other storage medium. This computer program can then be loaded into the RAM 1*b* when necessary and executed by the CPU 1*a*.

In this construction, the functions of the image data input unit 101, transmission request storage unit 102, image processor 103, file creation unit 104, transmission controller 105, image processing controller 106, transmission sequence controller 107, transmission job storage unit 108, processing contents designating unit 109 and recipient information database 1 DB and the like as shown in FIG. 3 are executed on the image transmission server 1.

The image data input unit 101 inputs the image data 8 representing the original document image G0 from the image input device 2 together with recipient information 71 that identifies the transmission destination (recipient) for the original document image G0. The input image data 8 is associated with the recipient information 71 and stored in the transmission request storage unit 102 as a requested job RJ.

Stored in the recipient information database 1 DB is specification information 72 that describes specifications for each image receiving terminal 3 governing (1) image data receipt capacity (such as the transmission protocol and transmission speed used for file receipt, for example) and (2) image output capacity (such as the existence of a color output capability, the resolution, or the orientation of output where the output is made onto paper, for example).

The processing contents designating unit 109 designates to the image processing controller 106 the contents of the image processing to be performed to the original document image G0 based on the specification information 72 to insure that the original document image G0 awaiting transmission is optimized for the image receiving terminal 3 that constitutes the recipient. This designation may be carried out based on user instructions rather than on the specification information 72.

It is possible for multiple recipients to be designated for a single original document image G0 (document), and to designate different types of image processing for the different recipients. The method for carrying out this designation operation is referred to as the 'designation method A' below. It is also possible to instruct that different image processing be carried out for each original document image G0 awaiting transmission. The method for carrying out this designation operation is referred to as the 'designation method B' below.

The image processor 103 is composed of a slant correction unit 131, a vertical orientation correction unit 132, an overlay correction unit 133 and a halftone correction unit 134, and carries out the correction operations described below to the original document image G0 for the requested job RJ as necessary.

The slant correction unit 131 performs correction by rotating the original document image G0 such that the original document image G0 does not appear slanted. The vertical orientation correction unit 132 corrects the vertical orientation of the non-slanted original document image G0. In other words, it rotates the original document image G0 by 180°. By carrying out processing using the slant correction unit 131 and the vertical orientation correction unit 132 as necessary, a completely straight original document image G0 (i.e., a non-slanted image with correct vertical orientation) can be obtained.

The overlay correction unit 133 inputs the original document image G0 that underwent the necessary processing by the slant correction unit 131 and the vertical orientation correction unit 132 and performs correction to eliminate any image drawn on the reverse side of the original document or any image drawn on the next sheet (a so-called 'overlay image') which is overlaid on the original document image G0. In other words, processing is performed to substitute the overlaid part with the background colors of the original document image G0, for example. The halftone correction unit 134 inputs the correctly-oriented and overlay-free original document image G0 and performs correction to eliminate any halftone dots or moiré that appear therein.

The processing carried out by the slant correction unit 131, vertical orientation correction unit 132, overlay correction unit 133 and halftone correction unit 134 are respectively termed the 'slant correction process S1', the 'vertical orientation correction process S2', the 'overlay correction process S3' and the 'halftone correction process S4'. Each correction process may also be referred to as an image processing 'operation'. The image processing performed to the original document image G0 is carried out by performing one or more of these correction processes (operations). The contents of the image processing are specified by specifying one correction process or multiple correction processes in combination (see FIGS. 4 and 6).

The file creation unit 104 generates a transmission image file 8B by converting into a binary data file where necessary the original document image G0 that was input by the image input device 2 or the original document image G0 that underwent image processing. The generated transmission image file 8B is associated with the recipient information 71 indicating the destination (recipient) and is then stored in the transmission job storage unit 108 as a transmission job HJ.

The original document image G0 that has undergone necessary image processing may be referred to as a 'corrected image Gh' below. The original document image G0 that can be sent to the image receiving terminal 3 may be referred to as a 'transmission image Gs'. In other words, either a corrected image Gh or an original document image G0 for which no image processing was necessary is used as the transmission image Gs.

The transmission sequence controller 107 determines the sequence by which processing will be carried out to the transmission jobs HJ stored in the transmission job storage unit 108 and controls the transmission controller 105 accordingly. In other words, it determines the sequence of transmission of the transmission images Gs and issues commands to the transmission controller 105 to ensure that transmission processing is performed based on this sequence.

For example, each time a transmission job HJ is stored in the transmission job storage unit 108, the transmission sequence controller 107 immediately sends the transmission job HJ to the transmission controller 105 and issues a command to initiate transmission processing. In other words, the transmission controller 105 is instructed to sequentially perform transmission processing to transmission jobs HJ in the order of their generation by the file creation unit 104.

This method of command issuance is termed 'transmission command method C' below.

Alternatively, the transmission sequence controller 107 waits for a prescribed wait period (for example, tens of seconds or several minutes) for transmission jobs HJ to be stored in the transmission job storage unit 108. After this prescribed wait period has elapsed, the transmission jobs HJ that have been stored (accumulated) during that period are arranged in order starting with the job having the fewest number of pages of transmission images Gs to be transmitted, i.e., the fewest number of pages in the document. It is also acceptable if they are arranged starting with the job for which the file size of the corresponding transmission image file 8B is smallest. Where the amount of memory remaining in the memory area allocated to the transmission job storage unit 108 is lower than a prescribed level, a transmission sequence that begins with the job having the largest number of pages or the largest file size may be used instead. The transmission sequence controller 107 then sends each transmission job HJ to the transmission controller 105 in accordance with the order of arrangement, and issues a transmission processing command. Once transmission processing of the first job is completed, the next job is sent to the transmission controller 105 and a transmission processing command is issued. Alternatively, the transmission jobs HJ are grouped by recipient, and the total size of the transmission jobs HJ assigned to each recipient (in terms of number of pages or file size) is sought. A command is then issued to the transmission controller 105 instructing it to send these grouped transmission jobs HJ as a group to the designated recipients in sequence beginning with the recipient as to which the total job size that was sought earlier is smallest (or largest). This method by which the transmission jobs HJ that are accumulated during this prescribed wait period are rearranged and transmission commands are issued in the order of their arrangement is termed the 'transmission command method D'.

Based on commands from the transmission sequence controller 107, the transmission controller 105 transmits the data representing the original document image G0 to the recipient indicated in the recipient information 71 after attaching the transmission image file 8B for the transmission job HJ to an e-mail. The transmission job HJ as to which processing has been completed is deleted from the transmission job storage unit 108.

The image processing controller 106 controls the image processor 103 such that the original document image G0 pertaining to each requested job RJ stored in the transmission request storage unit 102 is subjected to one or more correction processes from among the slant correction process S1 through the halftone correction process S4 as necessary. This control method varies depending on whether the designation method A or B described above is used.

<First Control Method (Control Method for Image Processor 103 in the Case of the Designation Method A)>

Figures 5, 6:
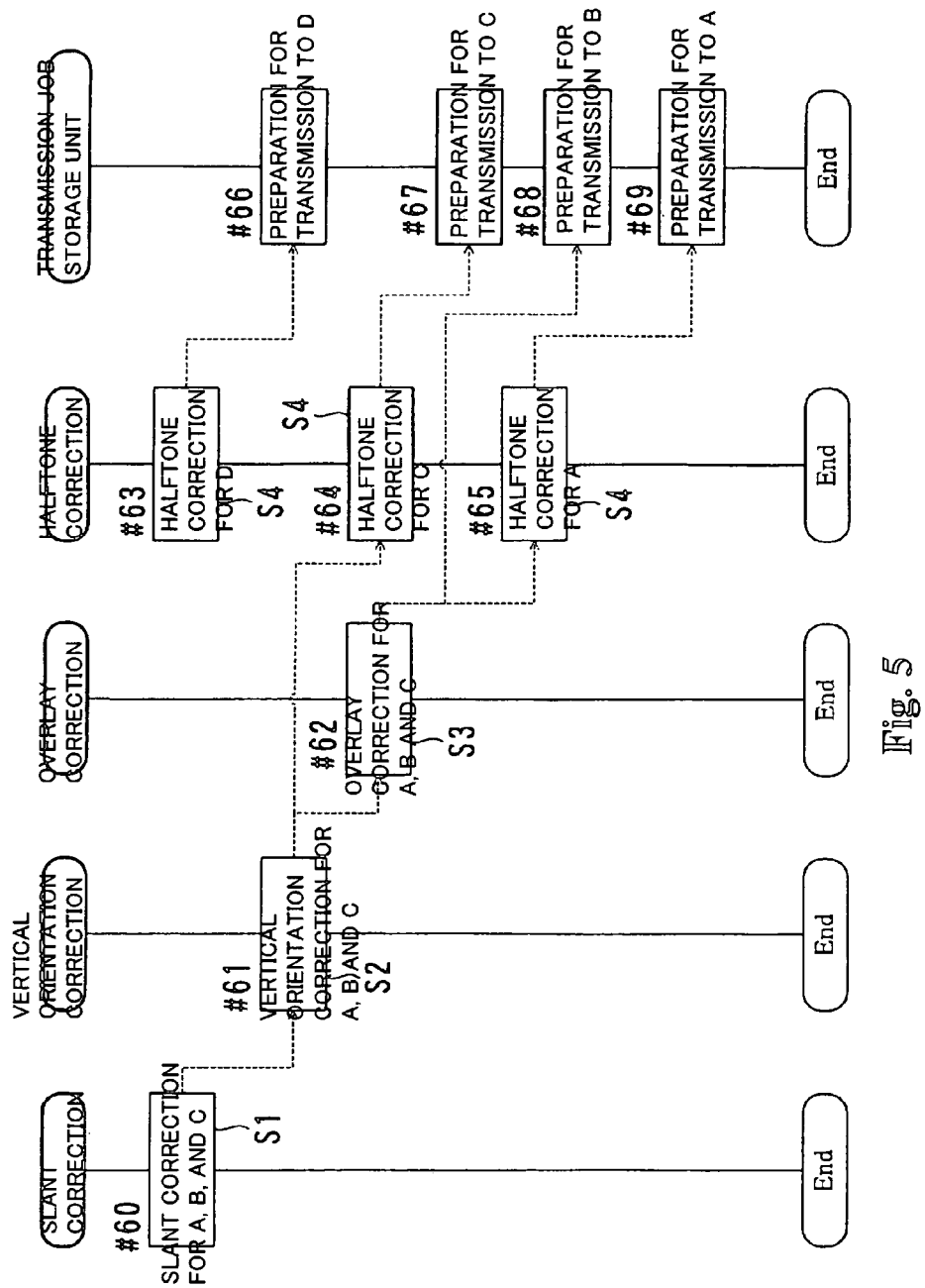
FIG. 5 is a flow chart explaining an example of the operations of the various components of the image processor where a first control method is used.
FIG. 6 shows an example of an image processing designation where multiple original document images are to be transmitted.

FIG. 4 shows an example of an image processing designation where one original document image G0 is to be transmitted to multiple recipients, while FIG. 5 is a flow chart explaining an example of the operations of the various components of the image processor 103 where a first control method is used.

In the case of the designation method A, i.e., where multiple destinations (recipients) are designated for a single original document image G0 and different types of image processing are designated for the different recipients, the image processor 103 is controlled in accordance with the following principles (A1) through (A3). In the description below, the image processing performed in order to obtain a transmission image Gs to be sent to a given recipient (x) may be referred to below as the 'recipient (x) image processing'.

(A1) Where multiple correction processes (operations) are specified as the contents of image processing, processing is carried out in the order of the slant correction process S1, vertical orientation correction process S2, overlay correction process S3 and halftone correction process S4. For example, in the case of the recipient C image processing shown in FIG. 4, correction processing is performed in the order of the slant correction process S1, the vertical orientation correction process S2 and the halftone correction process S4.

(A2) Where the same image correction process is to be performed regarding multiple recipients in the first step (operation), the recipients designated for that correction process are grouped together, and correction processing is carried out to the original document image G0 only once. The data resulting from this processing is then used in common for those recipients as interim data or final data. In other words, common correction processing is performed and the single correction result is shared for all recipients in the group. For example, in FIG. 4, the first operation in each of the respective image processing for the recipients A, B and C (i.e., the recipient A image processing, the recipient B image processing and the recipient C image processing) is the slant correction process S1. In this case, the slant correction process S1 is performed once only for the single 'root' original document image G0, and the slant-corrected original document image G0 (that is, the single result of such correction processing) is shared as interim or final data for each image processing.

(A3) The recipients grouped according to the principle A2 above for which the correction process to be performed in the second operation is also identical are grouped together again. The second correction operation is performed only once to the original document image G0 that was corrected in the first correction operation (i.e., the original document image G0 that is undergoing image processing) and the result of this correction is shared for the newly grouped recipients as interim data or final data of image processing. Similarly, for the third and subsequent correction operations as well, recipients for which the correction processing to be performed is identical from the first operation onward are regrouped together, and correction processing is carried out once for these newly-regrouped recipients. For example, in the case shown in FIG. 4, the data resulting from correction processing up to the second operation (i.e., the data obtained from the correction processes S1 and S2) is shared by the recipients A, B and C, and the data resulting from processing up to the third operation (i.e., the data obtained from the correction processes S1 through S3) is shared by the recipients A and B.

According to these principles, correction processing is performed for the original document image G0 pertaining to the requested job RJ designated for image processing as shown in FIG. 4 using the sequence shown in FIG. 5, for example.

First, the order of execution of correction processes for the image processing is determined based on the principle (A1). Recipients for which the first correction process (the first operation) is identical are then grouped together according to the principle (A2). As a result, the recipients A, B and C are grouped together in one group, and the recipient D is placed in a separate group.

The halftone correction process S4 constituting the first operation is then performed to the original document image G0 for recipient D's group (#63). Recipient D image processing is thereby completed. Therefore, the original document image G0 to which the halftone correction process S4 was carried out becomes the corrected image Gh, and is used as the transmission image Gs. A transmission job HJ is then generated by the file creation unit 104 based on the transmission image Gs, and preparations for transmission to the recipient D are completed when this transmission job HJ is stored in the transmission job storage unit 108 (#66).

At the same time that the processing of steps #63 and #66 is taking place, the slant correction process S1 constituting the first operation is carried out to the original document image G0 (#60) for the group composed of the recipients A, B and C. Because the second operation is the same for the recipients A, B and C, these three recipients remain grouped as they are in accordance with the principle (A3), and the vertical orientation correction process S2 is performed to the original document image G0 to which the slant correction process S1 was previously performed (#61).

While the third correction operation is the same for the recipients A and B, the third correction operation for the recipient C is different. Accordingly, the recipients A and B are grouped together in one group and the recipient C is placed in a different group. The overlay correction process S3 is then performed for the recipients A and B to the original document image G0 that previously underwent the correction processing of step #61 (#62), and at the same time, the halftone correction process S4 is performed for the recipient C (#64).

Image processing of the original document image G0 to be transmitted to the recipients B and C, respectively, is thereby completed. Accordingly, as in the case of step #66, transmission jobs HJ are generated for the recipients B and C, respectively, and are stored in the transmission job storage unit 108, whereby the preparations for transmission to the recipients B and C are completed (#67, #68).

A fourth operation remains in the recipient A image processing. Thus, the halftone correction process S4 is performed to the original document image G0 that was previously corrected in step #62 (#65). Image processing of the original document image G0 to be transmitted to the recipient A is thereby completed. As in the case of step #66, a transmission job HJ for transmission to the recipient A is generated, whereby preparations for transmission are completed (#69).

The transmission jobs HJ stored in the transmission job storage unit 108 are processed using the transmission command method C described above, for example. In other words, when the transmission jobs HJ are stored in the transmission job storage unit 108, the processing for transmission to the designated recipients is carried out sequentially.

According to the first control method, the image processing specified for each recipient is not performed in sequence as in the conventional art, but rather operations common to each image processing are performed to a single original document image, and the resulting data from these operations is shared. As a result, even where a command for image transmission to multiple recipients is issued, image processing and transmission processing for each recipient can be performed more efficiently that in the conventional art.

<Second Control Method (Control of Image Processor 103 in the Case of the Designation Method B)>

Figure 7:
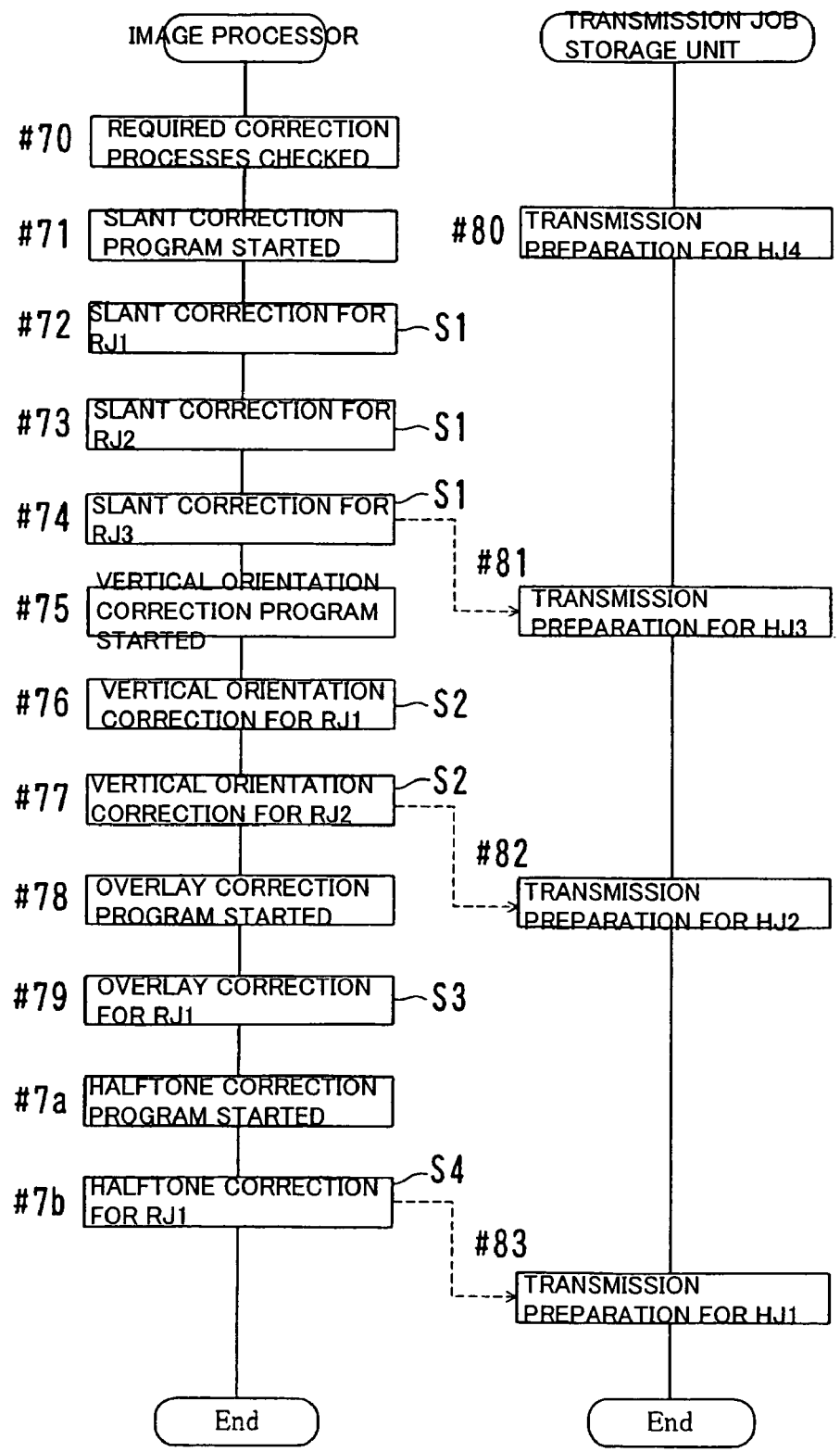
FIG. 7 is a flow chart explaining an example of the operations of the various components of the image processor where a second control method is used.

FIG. 6 shows an example of an image processing designation where multiple original document images G0 are to be transmitted, and FIG. 7 is a flow chart explaining an example of the operations of the various components of the image processor 103 where a second control method is used.

The image processing controller 106 shown in FIG. 3 controls the image processor 103 based on the following principles (B1) through (B3) in the case of the designation method B, i.e., where different types of image processing are designated for multiple original document images G0 for which transmission is requested.

(B1) Where multiple correction processes (operations) are specified as the contents of a single image processing action, the correction processes S1, S2, S3 and S4 are performed in that order (as in the case of the principle (A1) described above).

(B2) A command to begin image processing is not issued each time a requested job RJ (image data 8) is stored in the transmission request storage unit 102, but rather is issued for all of the requested jobs RJ stored during a prescribed period of time. In the example of FIG. 6, a command is issued for the four accumulated requested jobs RJ1 through RJ4.

(B3) Where multiple requested jobs RJ require the identical correction operations, those correction operations are performed to the original document images G0 pertaining to the various requested jobs RJ (including the original document image G0 currently undergoing processing) as a group.

According to these principles, correction processing is carried out to the respective original document images G0 corresponding to the requested jobs RJ1 through RJ4 having the designated image processing contents shown in FIG. 6 according to the sequence shown in FIG. 7, for example.

The types of correction processes required for the requested jobs RJ1 through RJ4 are checked (#70). It is thereby determined that each of the correction processes S1, S2, S3 and S4 is required for at least one requested job RJ.

The correction processes determined to be necessary as a result of the check are rearranged based on the principle (B1). Where the computer program that describes the sequence of each correction process is installed on a hard disk or other medium, i.e., where the slant correction unit 131 through the halftone correction unit 134 shown in FIG. 3 are implemented mainly through software, the computer program that executes the first operation that was placed at the first position as a result of the rearrangement, i.e., the slant correction process S1, is started (#71).

Because no image processing is designated for the original document image G0 for the requested job RJ4, the 'root' original document image G0 is used as the transmission image Gs, and a transmission job HJ4 is generated by the file creation unit 104 (see FIG. 3). This transmission job HJ4 is then stored in the transmission job storage unit 108, whereby preparations for transmission are completed (#80).

The slant correction process S1 is carried out to the respective original document images G0 for the requested jobs RJ1, RJ2 and RJ3 (#72-#74). Because this completes image processing of the original document image G0 for the requested job RJ3, preparations are made for transmission of the transmission image Gs for the requested job RJ3 (#81), as in the case of step #80. Similarly, after image processing is completed to the respective original document image G0 for the requested jobs RJ1 and RJ2 (#77, #7b), preparations are made for transmission (#82, #83).

The computer program that executes the vertical orientation correction process S2, which is the second correction process, is then started as necessary (#75), and the vertical orientation correction process S2 is performed to the original document images G0 for the requested jobs RJ1 and RJ2 that previously underwent the processing of the slant correction process S1 (#76, #77).

The computer programs that respectively execute the overlay correction process S3 and the halftone correction process S4 are then started in sequence, and these correction processes are sequentially performed to the original document image G0 for the requested job R1 (#78-#7b).

The transmission jobs HJ stored in the transmission job storage unit 108 are executed via the transmission command method C in the same manner as in the case of the first control method, for example.

According to the second control method, where multiple transmission requests are received, image processing is not carried out in the sequence used in the conventional art, but rather, the same operations that are common to multiple image processing actions are performed at one time. As a result, there is less switching between operations than in the conventional art, making image processing more efficient. In particular, where the functions of the slant correction unit 131 through the halftone correction unit 134 shown in FIG. 3 are realized mainly via software, the number of application boots can be reduced, thereby speeding up image processing relative to the conventional art.

<Third Control Method (Different Method of Controlling Image Processor 103 in the Case of the Designation Method B)>

Figure 8:
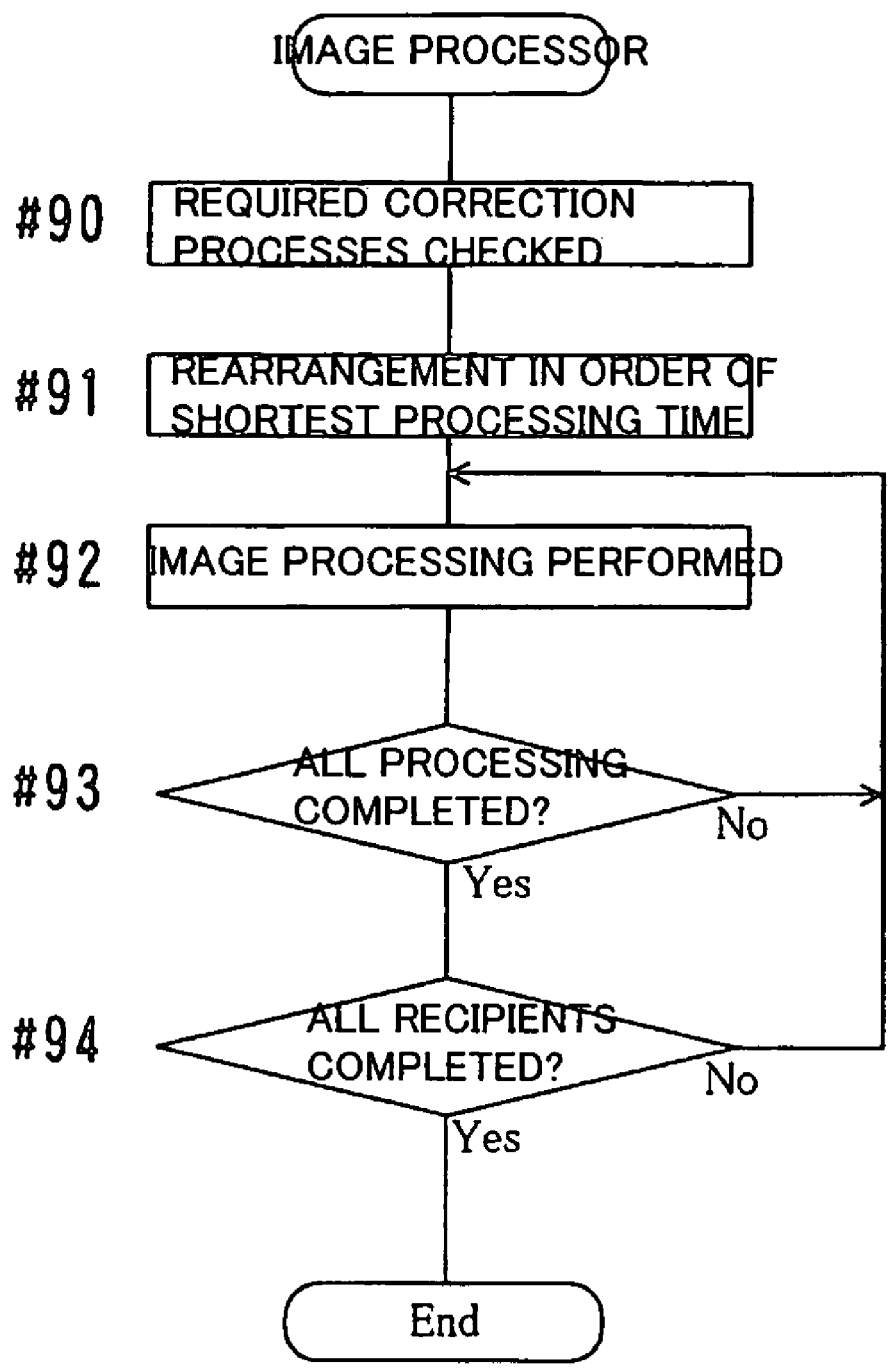
FIG. 8 is a flow chart explaining an example of the operations performed by the image processor where a third control method is used.

FIG. 8 is a flow chart explaining an example of the operation of the image processor 103 where a third control method is used, and FIG. 9 shows an example of the image processing designation and the like where multiple original document images G0 are to be sent.

In the case of the designation method B, the image processing controller 106 shown in FIG. 3 may control the image processor 103 in accordance with sequence shown in the flow chart of FIG. 8, for example.

First, the image processing controller 106 waits for a prescribed wait period for the accumulation of requested jobs RJ in the transmission request storage unit 102. During this period, it will be assumed that the requested jobs RJ1 through RJ5 are stored, as shown in FIG. 9, for example.

The image processing controller 106 groups the accumulated requested jobs RJ by recipient, and estimates the processing burden for image processing of all original document images G0 pertaining to the grouped requested jobs RJ (#90). Here, the estimated processing time is used as the estimated processing burden. The processing time may be sought based on the contents of the image processing to be performed. For example, the processing time is sought by counting the number of correction processes comprising the image processing required for the original document images G0 pertaining to each of the grouped requested jobs RJ, and multiplying that number by a prescribed period of time (an average processing time Td for a correction process). As a result, the processing times required for image processing of the original document images G0 for the requested jobs RJ grouped for the recipients A, B and C are estimated as approximately 4Td, 3Td and Td, respectively.

The recipients are then rearranged in the order of their estimated processing burden starting with the recipient having the smallest processing burden, i.e., in order of their processing time (#91) starting with the shortest processing time. Accordingly, the requested jobs RJ are rearranged in the order shown in the right-hand column of the table in FIG. 9. Image processing of the original document image G0 pertaining to the requested job RJ for the recipient requiring the shortest processing time is then performed (#92). Where multiple requested jobs RJ exist for one recipient, image processing (#92) of the original document images G0 for these requested jobs RJ is sequentially performed (NO in #93). Similarly, image processing of the original document images G0 for the requested jobs RJ is performed in sequence beginning with the recipient having the second shortest processing time (NO in #94). Where multiple requested jobs RJ exist for one recipient, image processing may be carried out by operation (correction process) as described in connection with FIG. 7 (the second control method).

According to the third control method, by grouping transmission requests by recipient and carrying out image processing in order from the transmission request for the recipient having the shortest estimated image processing time, image processing and transmission processing can be executed more efficiently than is possible under the conventional art.

In the third control method, recipients were rearranged in ascending order according to estimated image processing time, but it is also acceptable if they are rearranged in ascending order beginning with the requested job RJ-related document (original document image G0) having the smallest total number of pages. Where prescribed conditions are met, the recipients may be rearranged in descending order beginning with the longest estimated image processing time or the largest total number of pages.

Alternatively, it is acceptable if the total number of operations required for image processing is calculated for each recipient based on both the number of image processing operations (correction processes) and the number of pages, and the recipients are rearranged in ascending order of the total number of operations, beginning with the recipient requiring the smallest number of cumulative operations. For example, there are two requested jobs, i.e., RJ3 and RJ5, for the recipient B in FIG. 9. The requested job RJ3 requires three operations (correction processes) to be performed to seven document (original document image G0) pages. Therefore, by multiplying these two numbers together, the number '21' is obtained as the number of operations required for image processing of the requested job RJ3. Similarly, the number '3' is obtained as the number of operations required for image processing of the requested job RJ5. The total '24' of these two products is the cumulative number of operations required for image processing for the recipient B. Calculations may be performed for the recipients A and C in the same manner and the recipients may be rearranged accordingly.

Figure 10:
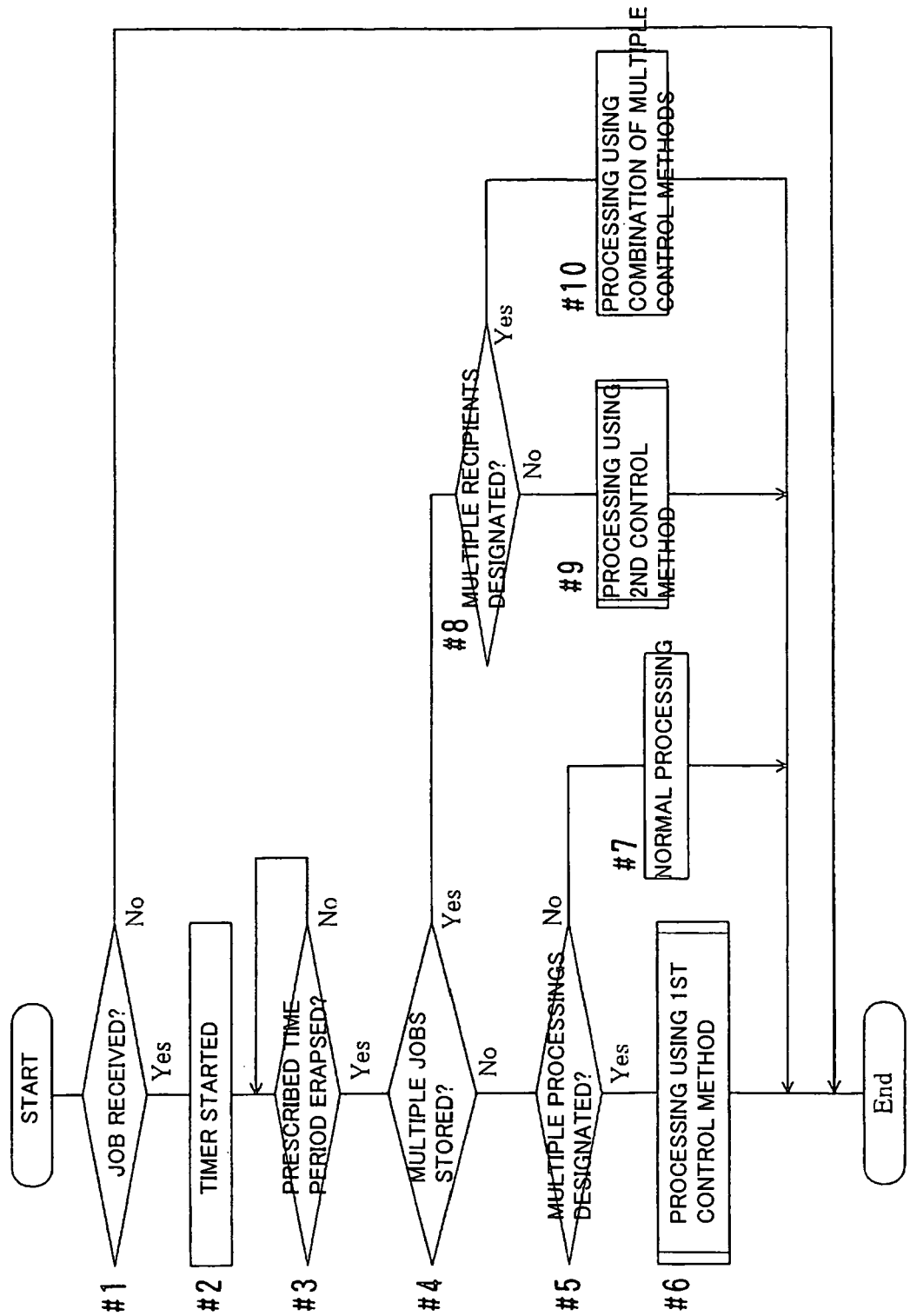
FIG. 10 is a flow chart explaining an example of the overall flow of processing performed in connection with the image transmission server.
Figure 11:
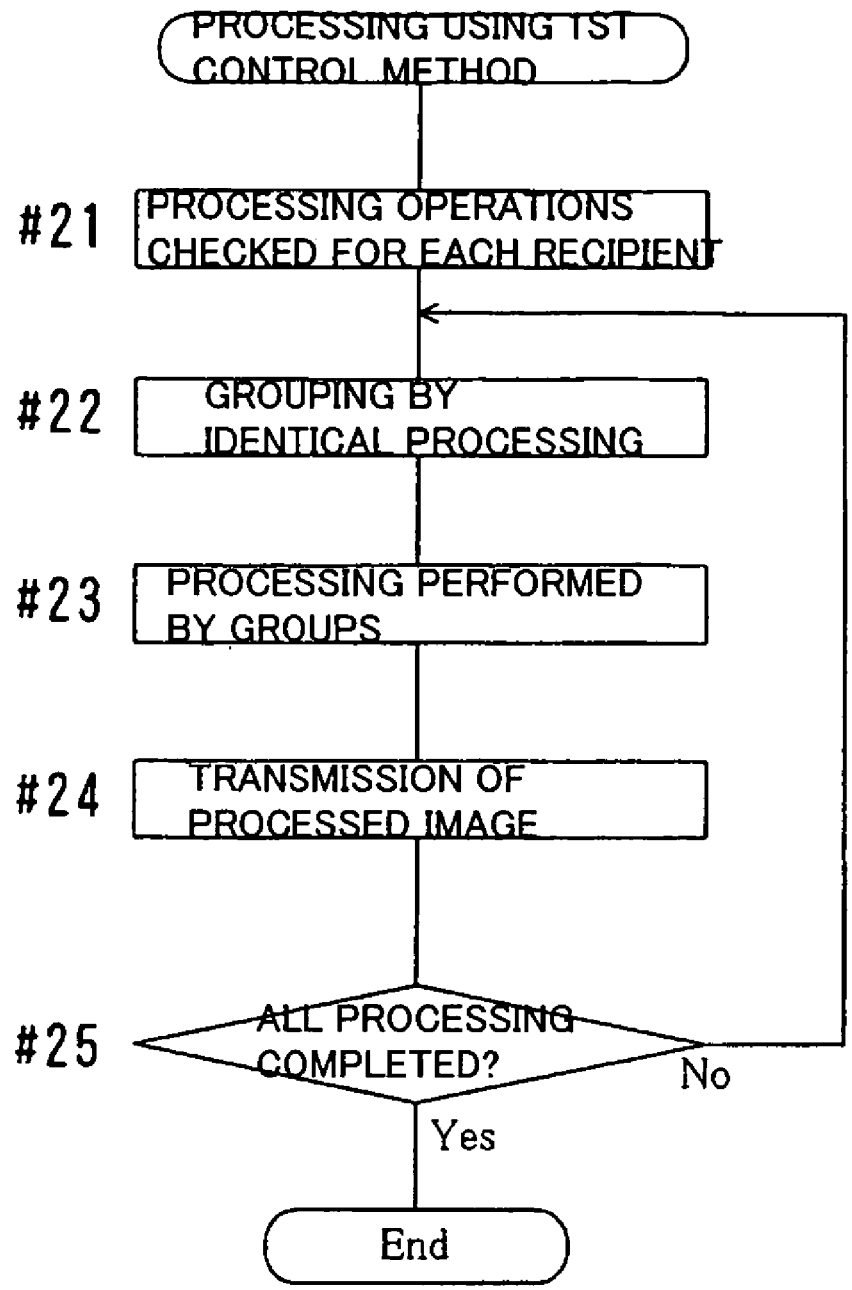
FIG. 11 is a flow chart explaining an example of the flow of processing performed under the first control method.
Figure 12:
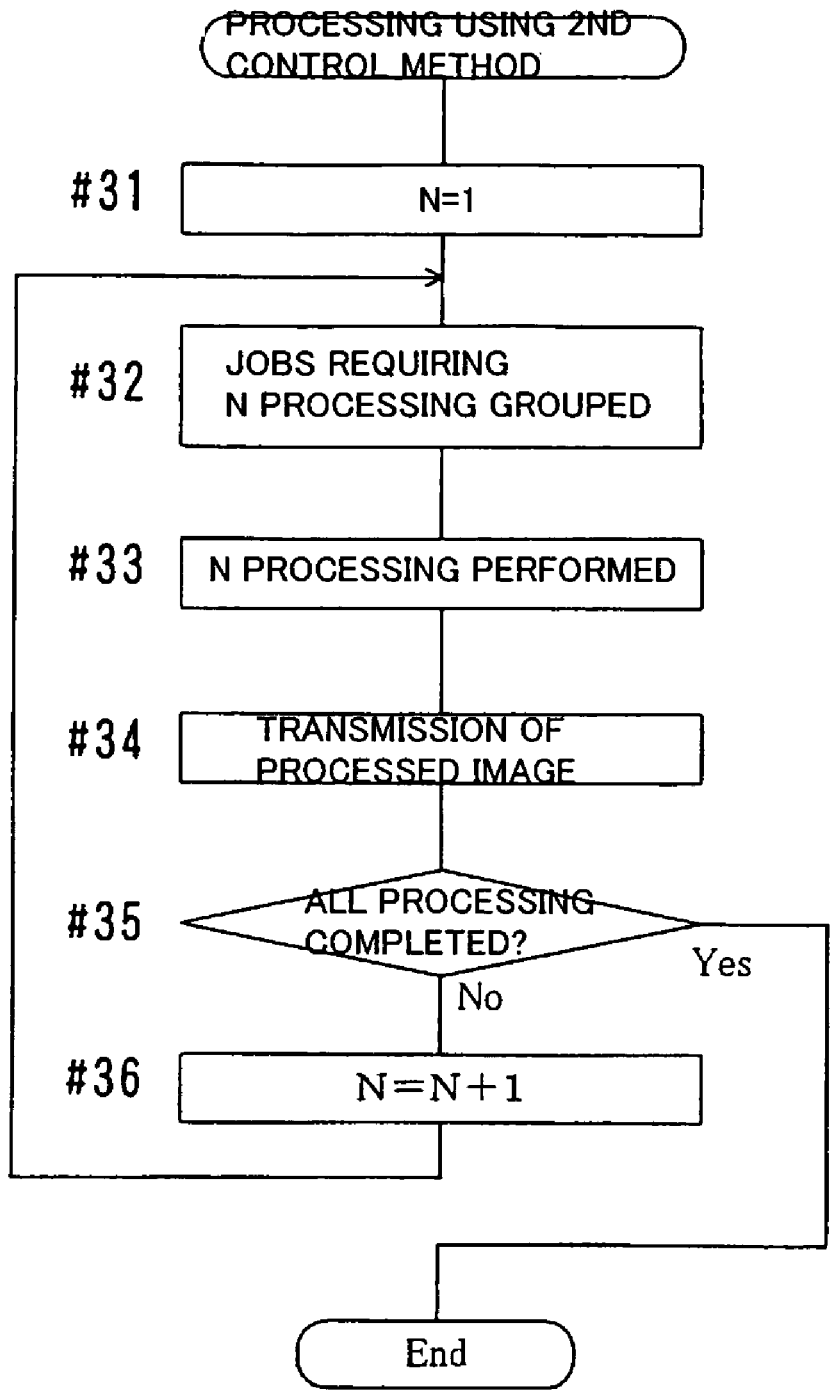
FIG. 12 is a flow chart explaining an example of the flow of processing performed under the second control method.
Figure 13:
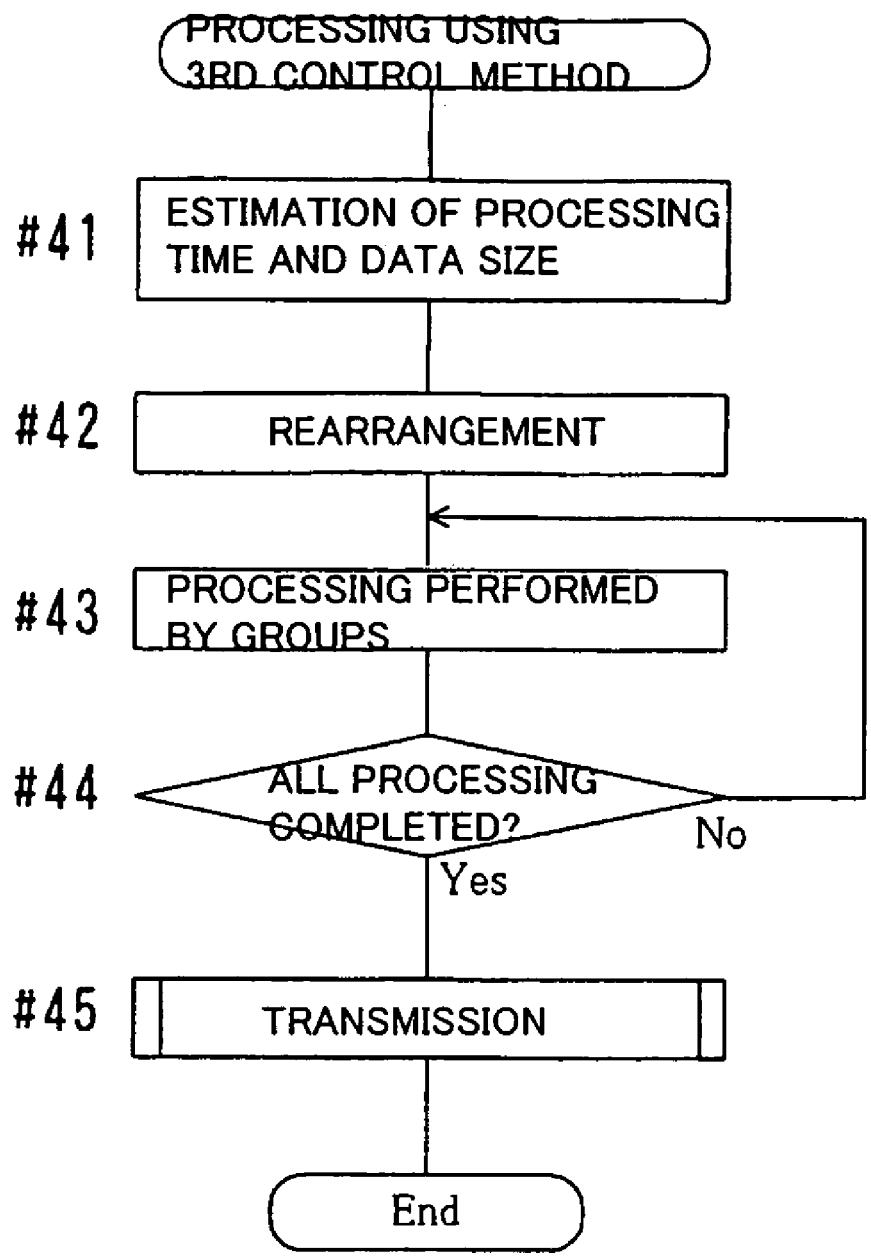
FIG. 13 is a flow chart explaining an example of the flow of processing performed under the third control method.
Figure 14:
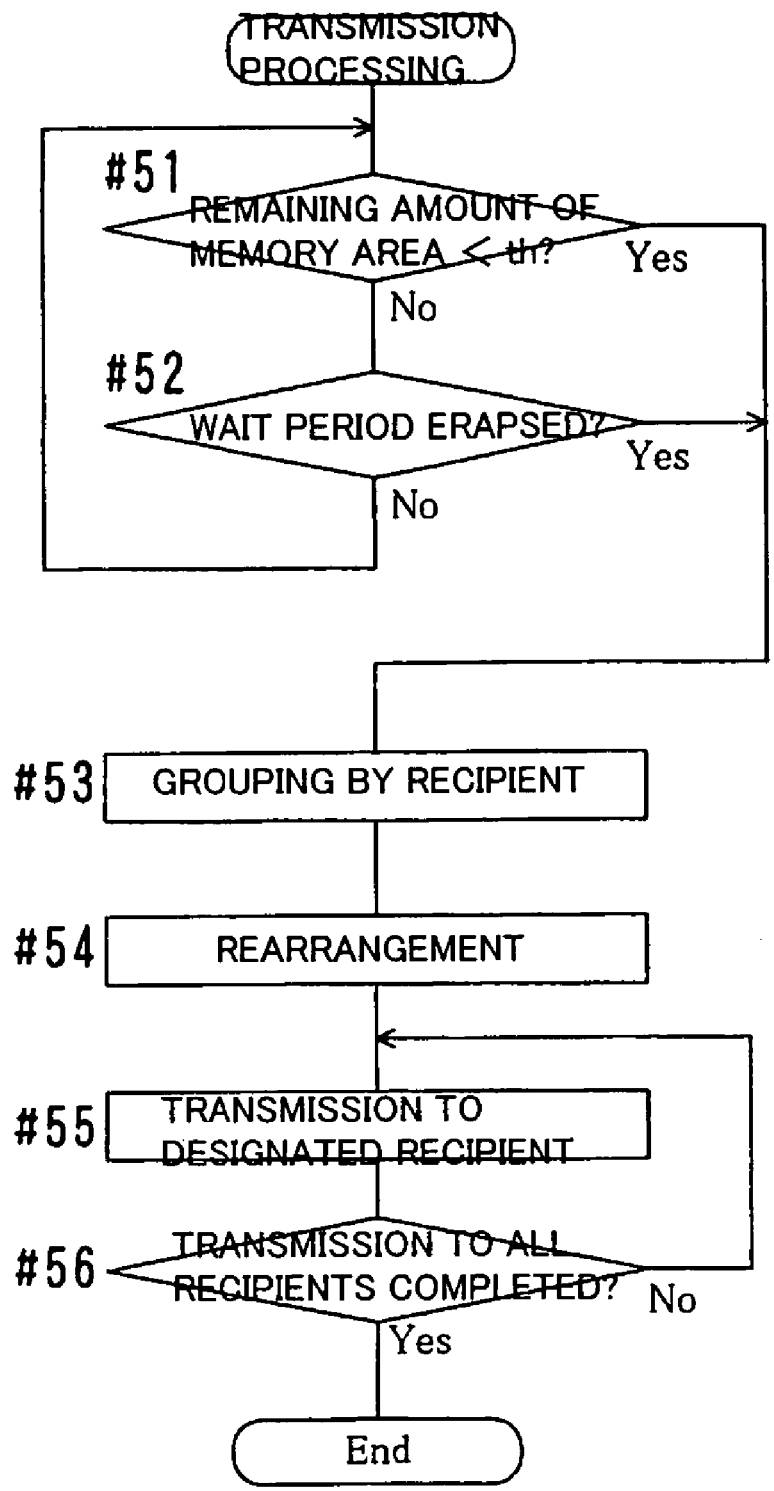
FIG. 14 is a flow chart explaining an example of the sequence of operations performed during transmission.

FIG. 10 is a flow chart explaining an example of the overall flow of processing performed in connection with the image transmission server 1, FIG. 11 is a flow chart explaining an example of the flow of processing performed under the first control method, FIG. 12 is a flow chart explaining an example of the flow of processing performed under the second control method, FIG. 13 is a flow chart explaining an example of the flow of processing performed under the third control method, and FIG. 14 is a flow chart explaining an example of the sequence of operations performed during transmission processing.

Where the processing described to this point is implemented via software, a computer program that executes the processing sequences shown in FIGS. 10 through 14 is run by the CPU 1a.

The processing sequence by which original document images G0 undergo necessary image processing after the image transmission server 1 receives requests for transmission thereof and are then transmitted to designated recipients will now be explained with reference to a flow chart.

In FIG. 10, when the image transmission server 1 receives from an image input device 2 a request for transmission of an original document image G0 to a designated recipient, it associates the image data 8 for that original document image G0 together with the recipient information 71 and stores them in the transmission request storage unit 102 as a requested job RJ (#1). After being reset, a timer is started (#2). When the timer recognizes that a prescribed wait period has elapsed (YES in #3), image processing of the original document images G0 of the requested jobs RJ accumulated in the transmission request storage unit 102 during this period begins.

Where only one requested job RJ is stored in the transmission request storage unit 102 (NO in #4), but image processing is designated for each recipient as shown in FIG. 4 (YES in #5), image processing of the original document image G0 is carried out via control of the image processor 103 (see FIG. 3) using the first control method (#6).

In other words, first, the image processing operations (correction processes) designated for each recipient are checked, as shown in FIG. 11 (#21). The recipients for which the correction process to be performed first (first operation) is identical are grouped together (#22). In the example of FIG.

4, a group composed of recipients A, B and C, for which the slant correction process S1 is to be performed first, and a group composed of the recipient D, for which the halftone correction process S4 is to be performed first, are created. Correction processing is then performed for these groups (#23). In the example of FIG. 4, the slant correction process S1 and the halftone correction process S4 are executed in a parallel fashion.

For the second and subsequent operations as well, recipients for which the correction processes performed up to this point and the correction processes to be performed subsequently are identical are grouped together (#22), and correction processing is executed for each group (#23). Here, where an original document image G0 (transmission image Gs) for which all necessary correction processes have been performed exists, the image is transmitted sequentially to the designated recipients (#24). The processing of steps #22-#24 is then repeated sequentially until all correction processing is completed (YES in #25).

Returning to FIG. 10, where one requested job RJ is stored (NO in #4) and the same image processing contents operations are designated for all recipients (NO in #5), the necessary correction processes are performed to the original document image G0 in the order of the correction processes S1 through S4, as in the conventional art. (#7).

Where multiple requested jobs RJ are stored (YES in #4), and only one recipient is designated for each requested job RJ (NO in #8), image processing is performed to the original document images G0 using the second control method (#9).

In other words, as shown in FIG. 12, the requested jobs RJ that require the correction process S1 are grouped together (#31, #32), and this correction process is carried out to the original document images G0 for these requested jobs RJ (#33). In the example of FIG. 6, the requested jobs RJ1, RJ2 and RJ3 (see the column marked with the encircled number '1') are grouped together, and processing of the slant correction process S1 is performed to each original document image G0.

Next, the requested jobs RJ that require the vertical orientation correction process S2 are grouped together (#36, #32), and this correction process is carried out to the original document images G0 for these requested jobs (#33). Grouping is similarly carried out for the correction processes S3 and S4 prior to execution of these processes, and the designated correction process is carried out to the respective original document images G0 for the requested jobs RJ of each group.

While the processing of step #33 is being repeated, where an original document image G0 (transmission image Gs) exists for which all necessary correction processing has been performed, it is transmitted sequentially to the designated recipient(s) (#34).

The image processing of step #9 in FIG. 10 may be performed according to the third control method rather than according to the second control method. In other words, as shown in FIG. 13, under this method, the accumulated requested jobs RJ are grouped according to recipient, and the all required image processing time for each recipient is estimated, or the data size (for example, the total number of document pages) for each recipient is sought (#41). The groups are then rearranged in order beginning with the shortest processing time or the smallest data size (#42), and the requested jobs RJ are rearranged accordingly. For example, where the estimated time is calculated based on the number of correction processes, the requested jobs RJ are rearranged as seen in the column in FIG. 9 entitled 'Ordinal position after rearrangement'.

The original document images G0 for the requested jobs RJ belonging to each group undergo image processing in the order of group ranking (#43, #44). Where multiple requested jobs RJ belong to a single group, image processing may be performed based on the second control method (see FIGS. 7, 12).

Transmission processing of the original document image G0 that previously underwent necessary image processing, i.e., of the transmission image Gs, is then executed in the order shown in FIG. 14 (#45), for example.

The size of the unused part of the memory area allocated to the transmission job storage unit 108 (i.e., the remaining capacity) is then checked (#51). If the remaining capacity is determined to be smaller than a prescribed amount (YES in #51), or if a prescribed wait period has elapsed (YES in #52), the image processing controller 106 advances to step #53.

The transmission jobs HJ are grouped by recipient (#53) and the groups are rearranged in ascending order of data size (such as the total number of document pages, for example) (#54).

The data representing the transmission images Gs for the transmission jobs HJ belonging to each group is then transmitted to each recipient in the rearranged order (#55, #56).

Alternatively, the data representing the transmission image Gs may be transmitted to the designated recipient each time the processing of step #43 is completed in FIG. 13.

Returning to FIG. 10, where multiple requested jobs RJ are stored (YES in #4), and include requested jobs RJ as to which the type of image processing is designated for each recipient (YES in #8), image processing of the original document images G0 is carried out by combining the first and the third control methods as appropriate (#10).

For example, first, the accumulated requested jobs RJ are divided into (i) those requested jobs RJ for which image processing is designated by recipient and (ii) those for which either there is only one recipient or common image processing is designated for all recipients. Image processing is carried out for the first group using the first control method (see FIGS. 5, 11). Image processing is carried out for the second group using either the second control method or the third control method (see FIGS. 7, 12, 13).

According to this embodiment, image processing and transmission processing can be performed more efficiently overall than is possible under the conventional art even where multiple requests for image transmission have been issued. Furthermore, transmitting the original document images G0 by recipient at one time enables transmission processing to be carried out even more efficiently.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The descriptions of this embodiment used an image transmission server 1 that executed image processing by combining the slant correction process, the vertical orientation correction process, the overlay correction process and the halftone correction process, but the present invention may be applied to an image transmission server 1 that executes image processing using a different combination of processes.

The image subject to image processing is not limited to an image obtained from scanning of an original document. For example, an image obtained from reading of an image stored on a recording medium such as a CD-ROM, or an image generated from an application program may be used.

Furthermore, the image transmission/receipt system 100, the construction of the entire image transmission server 1 or any component thereof, the contents of processing, the order of processing, the original document image transmission method, the processing time estimation method and the like may be freely changed within the essential scope of the present invention.

What is claimed is:

1. An image transmission apparatus that sends to specified recipients image data awaiting transmission after subjecting said image data to image processing including one or more operations, said image transmission apparatus comprising:
    multiple task processors that are respectively responsible for executing one or more of the image processing operations;
    a designating unit that designates the image processing operation(s) to be performed;
    a controller that, where multiple recipients are specified with regard to the image data and different image processing operations are specified for the different recipients, controls each task processor such that the nth operation is executed in common for the specified recipients for which all operations up to the nth operation are identical; and
    a transmission unit that transmits to the specified recipients said image data that has undergone all of the image processing operations designated for the specified recipient, while the controller continues to control each task processor to perform image processing operations on said image data for other specified recipients that have not undergone all of the designated image processing operations.

2. An image transmission apparatus that sends to specified recipients image data awaiting transmission after subjecting said image data to image processing including one or more operations, said image transmission apparatus comprising:
    an image data storage unit that stores the image data for which transmission has been requested;
    multiple task processors that are respectively responsible for executing one or more of the image processing operations;
    a designating unit that designates the image processing operation(s) to be performed to the image data stored in the image data storage unit;
    a controller that, where some of the image processing operations designated for each of multiple units of said image data stored in the image data storage unit are identical, controls each task processor such that the subsequent operations for each unit of image data are performed after said image data has undergone the shared operations; and
    a transmission unit that transmits to the specified recipients the image data that has undergone all of the image processing operations designated for the specified recipients.

3. An image transmission apparatus that sends to specified recipients image data awaiting transmission after subjecting said image data to image processing, said image transmission apparatus comprising:
    an image data storage unit that stores the image data for which transmission has been requested;
    an image processor that executes the image processing;
    a designating unit that designates the contents of the image processing to be executed for the image data stored in the image data storage unit;
    a processing burden estimation unit that, where multiple units of said image data are stored in the image data storage unit, divides the image data stored in the image data storage unit into groups by recipient and estimates for each group the processing burden of executing the image processing of the grouped image data;
    a controller that controls the image processor such that the image data undergoes the specified image processing in order from the group having the smallest estimated processing burden as estimated by the processing burden estimation unit to the group having the largest estimated processing burden; and
    a transmission unit that transmits to the specified recipients the image data that has undergone all of the image processing operations.

4. The image transmission apparatus of claim 3, wherein the image processor includes multiple task processors that are respectively responsible for executing the one or more image processing operations, the designating unit designates the contents of the image processing by combining one or more operations, and the processing burden estimation unit estimates the processing burden of executing the image processing based on the operations that describe the contents of the image processing.

5. A control method for an image transmission apparatus that transmits to specified recipients image data that has been subjected to image processing, wherein multiple task processors are respectively responsible for executing one or more of the image processing operations, said control method comprising the steps of:
    designating the image processing operation(s) to be performed to the image data awaiting transmission;
    where multiple recipients are specified for the image data awaiting transmission, and different image processing operations are specified for the different recipients, controlling each task processor such that the nth operation is executed in common for the specified recipients for which all the operations up to the nth operation are identical; and
    transmitting to the specified recipients the image data awaiting transmission as to which all of the image processing operations designated for the specified recipient have been performed, while continuing to control each task processor to perform image processing operations for other specified recipients that have not undergone all of the designated image processing operations.

6. A control method for an image transmission apparatus that transmits to specified recipients image data that has been subjected to image processing, wherein multiple task processors are respectively responsible for executing one or more of the image processing operations, said control method comprising the steps of:
    storing the image data awaiting transmission in an image data storage unit;
    designating the image processing operation(s) to be performed to the image data awaiting transmission that is stored in the image data storage unit;
    where some of the image processing operations designated for each of the multiple units of said image data awaiting transmission and stored in the image data storage unit are identical, controlling each task processor such that the subsequent operations for each unit of said image data awaiting transmission are performed after said image data has undergone the shared operations; and transmitting to the specified recipients the image data awaiting transmission as to which all of the image processing operations designated for the specified recipient have been performed.

7. A control method for an image transmission apparatus that transmits to specified recipients image data that has been subjected to image processing, wherein said image processing is executed by an image processor, said control method comprising the steps of:
   storing the image data awaiting transmission in an image data storage unit;
   designating the contents of the image processing to be performed to the image data awaiting transmission that is stored in the image data storage unit;
   where multiple units of said image data awaiting transmission are stored in the image data storage unit, dividing the image data awaiting transmission into groups by recipient and estimating, by a processing burden estimation unit, for each group the processing burden of executing the image processing of the all grouped image data awaiting transmission;
   controlling the image processor such that the image data awaiting transmission undergoes the specified image processing in order from the group having the smallest estimated processing burden as estimated by the processing burden estimation unit to the group having the largest estimated processing burden; and
   transmitting to the specified recipients the image data awaiting transmission as to which all of the image processing operations have been performed.

8. A computer readable medium storing computer program instructions which when executed on a computer that transmits to specified recipients image data that has been subjected to image processing, wherein multiple task processors are respectively responsible for executing one or more of the image processing operations, causes the computer to execute the following operations:
   designating the image processing operation(s) to be performed to the image data awaiting transmission;
   where multiple recipients are specified for the image data awaiting transmission, and different image processing operations are specified for the different recipients, controlling each task processor such that the nth operation is executed in common for the specified recipients for which all the operations up to the nth operation are identical; and
   transmitting to the specified recipients the image data awaiting transmission as to which all of the image processing operations designated for the specified recipient have been performed, while continuing to control each task processor to perform image processing operations for other specified recipients that have not undergone all of the designated image processing operations.

9. A computer readable medium storing computer program instructions which when executed on a computer that transmits to specified recipients image data that has been subjected to image processing, wherein multiple task processors are respectively responsible for executing one or more of the image processing operations, causes the computer to execute the following operations:
   storing the image data awaiting transmission in an image data storage unit;
   designating the image processing operation(s) to be performed to the image data awaiting transmission that is stored in the image data storage unit;
   where some of the image processing operations designated for each of the multiple units of said image data awaiting transmission and stored in the image data storage unit are identical, controlling each task processor such that the subsequent operations for each unit of said image data awaiting transmission are performed after said image data has undergone the shared operations; and
   transmitting to the specified recipients the image data awaiting transmission as to which all of the image processing operations designated for the specified recipients have been performed.

10. A computer readable medium storing computer program instructions which when executed on a computer that transmits to specified recipients image data that has been subjected to image processing, wherein said image processing is executed by an image processor, said computer program causes the computer to execute the following operations:
    storing the image data awaiting transmission in an image data storage unit;
    designating the contents of the image processing to be performed to the image data awaiting transmission that is stored in the image data storage unit;
    where multiple units of said image data awaiting transmission are stored in the image data storage unit, dividing the image data awaiting transmission into groups by recipient and estimating, by a processing burden estimation unit, for each group the processing burden of executing the image processing of the grouped image data awaiting transmission;
    controlling the image processor such that the image data awaiting transmission undergoes the specified image processing in order from the group having the smallest estimated processing burden as estimated by the processing burden estimation unit to the group having the largest estimated processing burden; and
    transmitting to the specified recipients the image data awaiting transmission as to which all of the image processing operations have been performed.

11. An image transmission apparatus according to claim 1, wherein said image processing comprises correction operations.

12. An image transmission apparatus according to claim 2, wherein said image processing comprises correction operations.

13. An image transmission apparatus according to claim 3, wherein said image processing comprises correction operations.

14. A control method according to claim 5, wherein said image processing comprises correction operations.

15. An control method according to claim 6, wherein said image processing comprises correction operations.

16. An control method according to claim 7, wherein said image processing comprises correction operations.

17. A computer readable medium according to claim 8, wherein said image processing comprises correction operations.

18. A computer readable medium according to claim 9, wherein said image processing comprises correction operations.

19. A computer readable medium according to claim 10, wherein said image processing comprises correction operations.

* * * * *